US008475928B2

(12) United States Patent
Arroyo-Bernal

(10) Patent No.: US 8,475,928 B2
(45) Date of Patent: Jul. 2, 2013

(54) ROCK SHEET AND PLATE MIX BASED ON VOLCANIC ROCK PARTICLES USEFUL FOR BUILDING AND DECORATION

(75) Inventor: Jesùs Federico Arroyo-Bernal, Jalisco (MX)

(73) Assignee: Neocantera Board S.A. De C.V., Guadalajara, Jalisco (MX)

( * ) Notice: Subject to any disclaimer, the term of this patent is extended or adjusted under 35 U.S.C. 154(b) by 348 days.

(21) Appl. No.: 13/018,120

(22) Filed: Jan. 31, 2011

(65) Prior Publication Data

US 2012/0196136 A1 Aug. 2, 2012

(51) Int. Cl.
*B32B 27/06* (2006.01)

(52) U.S. Cl.
USPC ............. 428/450; 428/13; 428/323; 428/446; 524/13; 524/456

(58) Field of Classification Search
None
See application file for complete search history.

(56) References Cited

U.S. PATENT DOCUMENTS

| | | | | |
|---|---|---|---|---|
| 5,514,722 A | 5/1996 | Di Geronimo | | 521/42 |
| 2004/0047694 A1* | 3/2004 | Sandor et al. | | 405/263 |
| 2007/0112098 A1 | 5/2007 | Heiman | | 523/218 |
| 2008/0033092 A1* | 2/2008 | Santos et al. | | 524/445 |
| 2009/0011251 A1 | 1/2009 | Englert et al. | | 428/446 |
| 2009/0085253 A1* | 4/2009 | Kruss | | 264/333 |

FOREIGN PATENT DOCUMENTS

| | | |
|---|---|---|
| EP | 1553 064 A1 | 7/2005 |
| EP | 1932814 A1 | 6/2008 |
| EP | 2202056 A1 | 6/2010 |
| WO | WO 2007/106934 A1 | 9/2007 |

OTHER PUBLICATIONS

International Search Report & Written Opinion, application No. PCT/MX2011/000031 dated Aug. 24, 2011.
International Search Report, application No. PCT/MX2009/000086 dated Mar. 12, 2010.

* cited by examiner

*Primary Examiner* — Mark Ruthkosky
*Assistant Examiner* — Julia L Rummel
(74) *Attorney, Agent, or Firm* — Winston & Strawn LLP

(57) ABSTRACT

The present invention relates to a mix to manufacture a rock sheet on a solid base useful for decorating purposes. The mix includes a binding composition of an agglutinating agent comprising volcanic rock particles having a particle size of 1 to 5 microns and a polymer mixture in a combined amount sufficient to act as a binder for other components of the laminate; a silicate compound in an amount sufficient to stabilize the composition; and water in an amount to moisten and fluidize the composition. The mix can contain other components for forming laminates or shapes, and can be formed as or on a plate useful for building and decorating buildings made-up by a rock sheet manufactured with the aforementioned mix and a solid base. The methods for preparing the aforementioned mix and plates useful for the construction and decoration of construction surfaces are also disclosed.

15 Claims, 2 Drawing Sheets

ROCK SHEET AND PLATE MIX BASED ON VOLCANIC ROCK PARTICLES USEFUL FOR BUILDING AND DECORATION

TECHNICAL FIELD OF THE INVENTION

This invention is related to the technical fields of construction and decoration, specifically with regard to finishing and decoration in buildings because it is a mix of rock sheet and plate, useful for the finishing and decoration of construction surfaces and other objects. It is also related to its manufacturing methods. These products are made of volcanic rock particles.

BACKGROUND OF THE INVENTION

Volcanic rocks have always been a highly valued material due to their great beauty and to the fact that they can be easily carved and cut by man. This has made them scarce, and its use in modern building has become more expensive, thus turning them into an elitist product that can only be used in luxury constructions. These rocks are also known as igneous or elastic igneous rocks, e.g., rock that is composed of fragmented volcanic products ejected from volcanoes in explosive events.

Soil erosion in Mexico partly due to the exploitation of volcanic rocks in quarries amounted to 718 million tons, having caused an environmental contamination greater than 37 million tons of useless solid residues in the national territory (INEGI, economic and ecological accounts, 2004).

Several plates with the appearance of natural rocks are known, but these are only imitations: when we touch, smell and look at them, the fact that they are not rocks becomes obvious. These plates are generally used in constructions largely made with prefabricated building materials for time and cost saving installation purposes.

In this category there are also aluminum, polystyrene and other material plates with a covering of natural rocks extracted in limited sizes with regard to their weight and the plate that supports them. These rocks were adhered to the plates with synthetic adhesives, so the manufacturing process for making them has a very high cost and their dimensions are limited to the size of the rock from which they were obtained, making the piece and the manufacturing method limited in size and shape.

Natural volcanic rock plates have existed for thousands of years and their most important disadvantages are their weight, difficult transportation and placement. The plates extracted from natural volcanic rocks are usually somewhat fragile when they are handled: vibration or impacts can make them break. Due to this they have to be made thick enough so they can be stronger and resist breakage. When laying them on a wall, these plates usually have a colossal weight that makes it difficult or impossible to install them without causing damage to them or the wall. The wall on which they are laid has to be tough and firm enough to be able to support the weight of the plate. And even then the plate runs the risk of being fractured due to the constant impacts produced when they are laid.

Due to the aforementioned inconveniences, improved rock plates useful for decoration and based on volcanic rock particles are needed, and these as well as formulations and manufacturing processes therefore are now provided by the present invention.

SUMMARY OF THE INVENTION

The invention relates to various binding compositions and mixes for forming articles for use as or in building construction.

In one embodiment, the invention relates to a binding composition for manufacturing a laminate, which comprises an agglutinating agent comprising volcanic rock particles having a particle size of 1 to 5 microns and a polymer mixture in a combined amount sufficient to act as a binder for other components of the laminate; a silicate compound in an amount sufficient to stabilize the composition; and water in an amount to moisten and fluidize the composition.

In this binding composition, the volcanic rock particles are present in an amount of 25 to 50%; the polymer mixture is present in an amount of 10 to 40%; and the silicate is present in an amount of 1 to 10% with the percentages based on the weight of the dry composition. The water is added to enable the composition to be combined with other materials to form a mix for manufacturing a laminate. The mix comprises the binding composition and a filler of solid particulate material of rock, plastic, glass, wood, metal or mineral.

Another embodiment relates to a preferred mix for manufacturing a laminate, which comprises volcanic rock particles having diameters between 1 micron and 3 mm present in an amount of greater than 50% of the mix; an agglutinating agent comprising a polymer mixture in an amount sufficient to act as a binder for the rock particles; a silicate compound in an amount sufficient to stabilize the mix; and water in an amount to moisten and fluidize the mix.

The rock particles are advantageously present in an amount of about 58% to 88% of the mix, with the rock particles being present in a plurality of different size fractions, including a first fraction having a particle size of 1 to 5 microns and being present in an amount of 18 to 28% by weight of the mix; a second fraction having a particle size of 0.25 mm to 1.75 mm and being present in an amount of 10 to 20% by weight of the mix; and a third fraction having a particle size of 2 mm to 5 mm and being present in an amount of 30 to 40% by weight of the mix.

The agglutinizing agent is preferably emulsified, and is present in an amount of 8 to 25% by weight of the mix. This agent comprises a water dispersible block copolymer and a vinyl polymer in a weight ratio of 1:4 to 3:2, preferably 1:1 to 2:3. The water dispersible polymer powder comprises the block copolymer in an amount of 4 to 10% by weight of the mix; and the vinyl polymer in an amount of 4 to 15% by weight of the mix.

A preferred block copolymer is a butyl acrylate and styrene co-polymer, while the vinyl co-polymer comprises the combination of a vinyl acrylic co-polymer present in an amount of about 3 to 10% by weight of the mix; and a polyvinyl acetate resin present in an amount of about 1 to 5% by weight of the mix.

The mix also includes a silicate compound to improve the stability of the mix. This compound is preferably a magnesium hydrosilicate in an amount of about 1 to 5% by weight of the mix. The silicate compound can also be a kaolin clay e.g., $Al_2Si_2O_5(OH)_4$.

The mix includes the water in an amount of about 15 to 30% by weight to facilitate processing and combining of the ingredients.

The invention also relates to an article prepared by forming one of these mixes into a desired shape and allowing the formed mix to dry. The form can include a sheet, plate, tile, column, or beam having an exterior surface that is polished to the desired finish. The polished finish can also be treated with a sealer. The article can include metal, glass, wood, or fiber reinforcement or can be provided on a substrate of plastic, wood, metal, an inorganic mineral, cement or concrete, with the substrate optionally containing an adhesive for securing the article to a floor or building. The article can be made as a interior or exterior structural component of a building or other structure.

Another embodiment of the invention relates to a method for preparing the mix by providing water in an amount of between about 0.1 to 0.4 liters for each kilogram of volcanic rock particles and homogenizing the mix. The agglutinizing agent is preferably emulsified and the mix is homogenized in a conventional mixer operated at 500 to 1000 rpm for 30 to 120 minutes.

The homogenized mix can be made into a number of different articles, The invention includes a method for forming a decorative rock article, by forming the homogenized mix into a desired shape and allowing the formed mix to dry. The homogenized mix can be formed into the desired shape by casting or molding. Generally, the dried mix is polished to a desired finish, optionally followed by application of a sealer. The method also includes forming the homogenized mix onto a substrate; polishing the dried mix to a desired finish; and optionally providing the substrate with an adhesive for securing the article to a floor, wall or side of a structure. The material can also be used to form those parts of the structure.

BRIEF DESCRIPTION OF THE DRAWINGS

The details that characterize the mix, rock sheet and plate based on volcanic rock particles used for construction and decoration, and the manufacturing processes for this invention, clearly described in the following description, as well as in the tables and figures attached hereto, wherein.

DETAILED DESCRIPTION OF THE INVENTION

Figure 1:
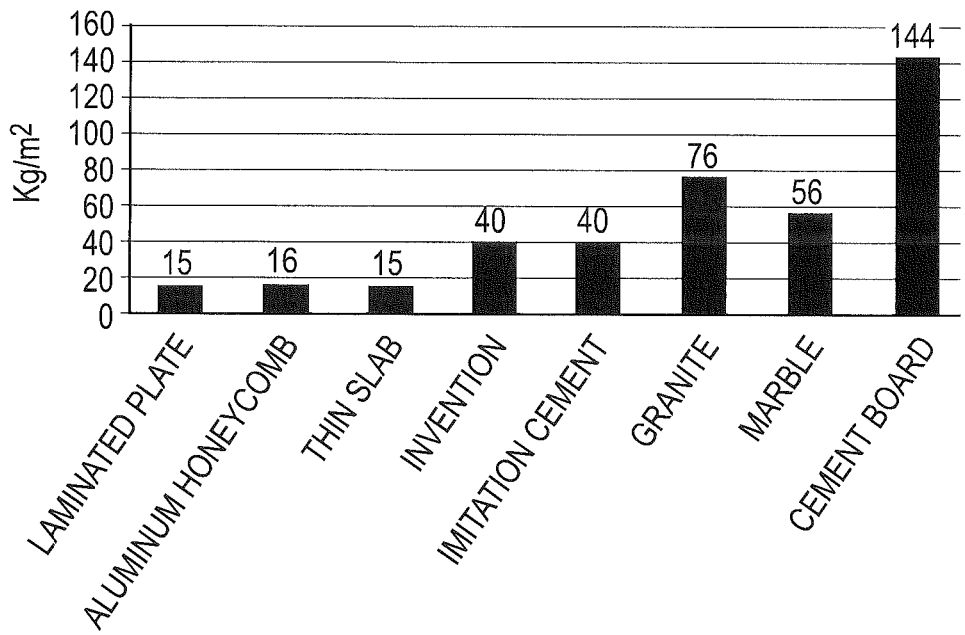
FIG. 1 is a graph in which the weights of the inventive plate are illustrated compared to commercial products.
Figure 2:
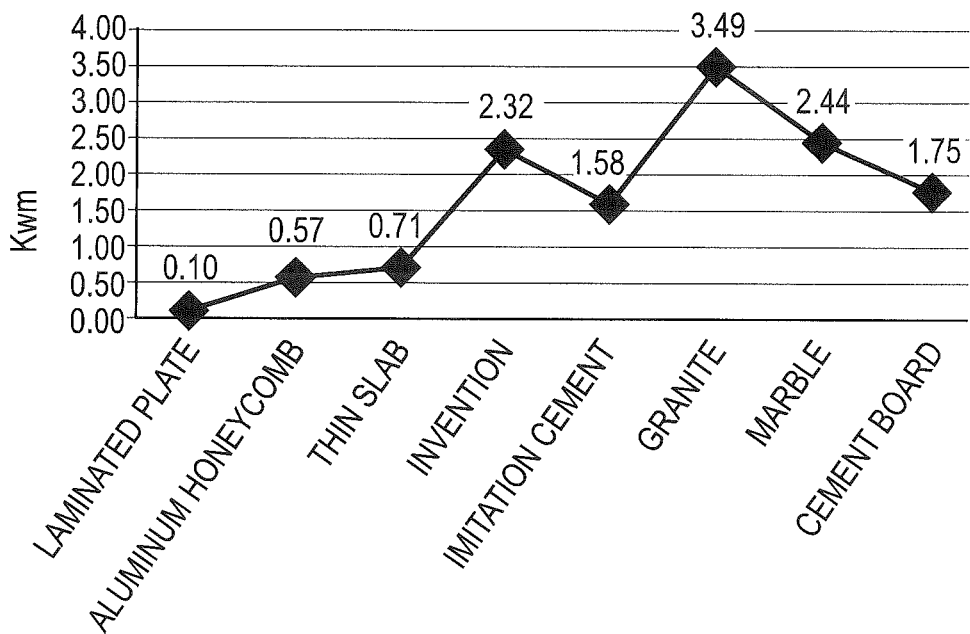
FIG. 2 illustrates the behavior of the thermal conductivity between the inventive plate and some commercial products.
Figure 3:
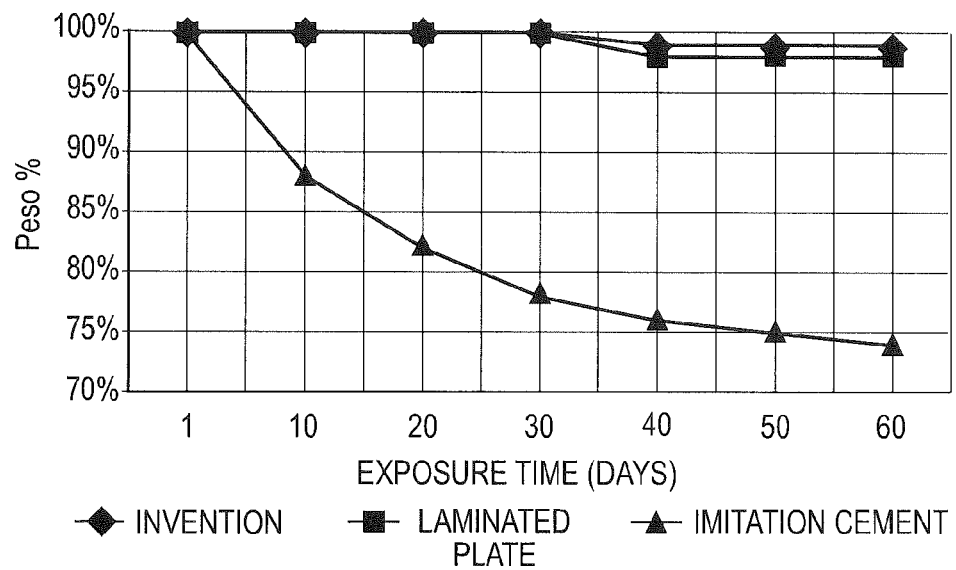
FIG. 3 shows the resistance of the inventive plate to hydrochloric acid and to some commercial products.
Figure 4:
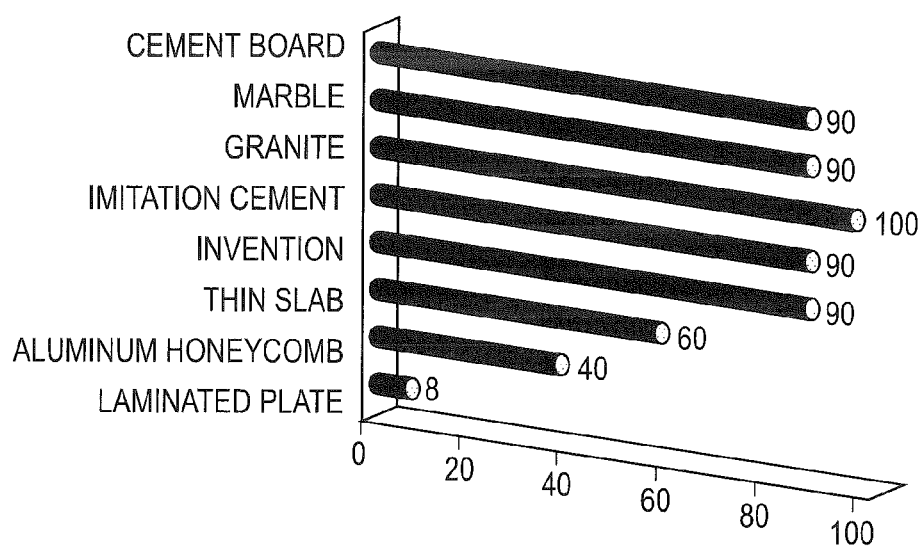
FIG. 4 illustrates the installation time of the inventive plate compared to that of some other commercial products.

The present invention provides products that take advantage of the beauty and high perceived value of volcanic rocks, i.e., igneous or elastic igneous rocks, and that are made from wastes generated from volcanic rock deposits that are found are in limited areas of the world. When these deposits are exploited, a large volume of volcanic rock waste is generated and a large environmental contamination is created due to the fact that the volcanic rocks removed from the deposits are not utilized 100%.

The present invention now recycles this volcanic rock waste to create new and useful rock panel products. These products take advantage of the waste generated when large blocks of volcanic rocks are extracted to create artificial volcanic rock plates with the same characteristics of natural volcanic rock plates, to turn these wastes into a volcanic rock plates that substitute natural volcanic rock plates 100%, but with the advantage of not creating contamination and being lighter, aside from the additional attributes described herein.

The plates of the invention have a number of desirable characteristics. They have the same appearance, texture, color and scent of natural volcanic rock stones or dimensional rocks, but they are at least 50% lighter than natural volcanic rock plates. They are also resistant to acid rain (hydrochloric acid, sulfuric acid and nitric acid) due to the use of the volcanic rocks that have this property. They are resistant to ultraviolet rays and can be used for shielding such rays when desired. The plates are functional, easily and quickly installed on any prefabricated or traditional element.

The invention relates to a mix to make a sheet of rock on a solid base that can be used for construction and decoration, preferably formed by volcanic rock particles, a vinyl-acrylic co-polymer, a polyvinyl acetate resin, butyl acrylate and styrene co-polymers, magnesium hydro silicate and water.

The invention also relates to a stone sheet for decorating surfaces, made with the aforementioned mix. Another embodiment relates to a plate useful for construction and for decorating buildings that includes the rock sheet described above and a solid base.

Also, specific methods for preparing the aforementioned mix are include i) mixing the different volcanic rock particles in a conventional way; ii) moistening the volcanic rock particles with 1 l of water for each 4 kg of volcanic rock particles; iii) adding all the vinyl-acrylic co-polymer, the polyvinyl acetate resin, the butyl acrylate and styrene co-polymers, and the magnesium hydro silicate and iv) making a homogeneous mix with a conventional stainless steel mixer at 650 rpm for 75 minutes.

This invention also includes specific methods for making the aforementioned plate, which includes: i) delimiting on the solid base the area on which the rock sheet is going to be laid, for which purpose a perimeter edge is provided on the solid base; ii) adding in a uniform manner the mix described in 1, 2 3 and 4 on the area delimited in the preceding stage until the area within the perimeter edge is covered; iii) letting the mix dry in the open for a 24 to 72 hours period; iv) roughing down the plate with diamond cups according to the type of finishing: rustic or smooth; v) cleaning the laminated plate of all the residues, preferably through vacuum cleaning; vi) applying a layer of water-resistant sealer over the sheet and vii) letting the water-resistant sealer dry for 3 hours in the open. For faster setting, heat or other forms of energy, e.g., microwaves, can be used to dry the material.

Examples

The following examples show how to formulate the binding compositions and mixes of the invention to prepare various articles.

The invention began with volcanic rock particles obtained from wastes, and tests were conducted to find the best combination of volcanic particles and agglutinating agents. The agglutinating agents are generally co-polymers that are commercially sold in the form of emulsions, as well as resins. Water was also used to moisten the particles and be a complement to the volume of the mix in a rate of 1 liter of water for each 4 kilograms of particles. The results are shown in Table 1.

As seen in Table 1, these tests show that the best combination of agglutinating agents was the combination of butyl acrylate and styrene+polyvinyl acetate resin+vinyl-acrylic co-polymer due to the higher plasticity that was imparted, with a shorter drying time and no visible cracks. The shortest accepted drying time was found to be 72 hours because no agglutinating agent was found to provide a drying time that was less than 72 hours.

TABLE 1

Behavior of several different agglutinating agents mixed with volcanic rock particles

| Agglutinating Agent | Plasticity | Drying (hours) | Presence of Cracks |
|---|---|---|---|
| Portland Cement | 2.5 | 80 | Yes |
| Puzolanic Cement | 0.4 | 90 | Yes |
| Polyester Resin | 3 | 85 | Yes |
| Butyl acrylate and styrene co-polymers | 4.7 | 72 | Yes |

TABLE 1-continued

Behavior of several different agglutinating
agents mixed with volcanic rock particles

| Agglutinating Agent | Plasticity | Drying (hours) | Presence of Cracks |
|---|---|---|---|
| Butyl acrylate and styrene co-polymers + polyvinyl acetate resin | 5 | 60 | No |
| Butyl acrylate and styrene co-polymers + polyvinyl acetate resin + vinyl-acrylic co-polymer | 10 | 24 | No |

Plasticity was measured in a 0-10 scale where the highest value indicates high plasticity.

Once the best combination of agglutinating agents was found, the best amounts or concentrations of each component was determined by additional testing. The experiment that was made for this purpose used each of the components in different quantities until the optimum doses were determined. The results of these tests are shown in Table 2.

To endow this mix with more resistance to water, additional components were added, in particular an alkaline hydro silicate such as magnesium hydro silicate or kaolin clay, in order to provide a colloidal mix that is similar to volcanic lava, but at room temperature, with the property of adhering and smelting on any material, and with the same physical characteristics of a natural volcanic rock when dry, so it can withstand the same finishing of natural dimensional rocks.

When analyzing the doses of the different components of the mix being discussed it was found that when 0.5% of all the co-polymers were used in combination with the silicate and water, an important amount of particles per square centimeter were detached, the best range being from 1% to 10%, except for water, where the corresponding range was 1% to 20%.

When the co-polymers and magnesium hydro silicate were applied beyond 15%, the appearance of the sheet was not desirable because the excessive amounts of those additives make the volcanic particle relief disappear. These doses are not preferred for decorative purposes despite that the resulting plates exhibited good hardness. These plates may be used in other applications, such as where abrasion or wear resistance is desired without the need for a decorative appearance.

TABLE 2

Behavior of the different doses to which
the components of the mix were submitted

| Components | Dose (%) | DP per $cm^2$ | Appearance | Hardness (gr/cm2) |
|---|---|---|---|---|
| Volcanic rock particles | 55 | — | 2 | 0.5 |
| | 65 | — | 4 | 3 |
| | 70 | — | 5 | 6 |
| | 80 | — | 5 | 10 |
| | 85 | — | 3 | 1.2 |
| Butyl acrylate and styrene co-polymers | 0.5 | 35 | 2 | 1 |
| | 1 | 5 | 4 | 4 |
| | 5 | 0 | 5 | 8 |
| | 10 | 0 | 4 | 9 |
| | 15 | 0 | 1 | 8 |
| Polyvinyl acetate resin | 0.5 | 30 | 1 | 2 |
| | 1 | 3 | 4.5 | 6 |
| | 5 | 0 | 5 | 8 |
| | 10 | 0 | 5 | 8 |
| | 15 | 0 | 1.5 | 6 |
| Vinyl-acrylic copolymer | 0.5 | 25 | 1.9 | 1.6 |
| | 1 | 0 | 4.5 | 6 |
| | 5 | 0 | 5 | 9 |
| | 10 | 0 | 4.5 | 10 |
| | 15 | 0 | 1.2 | 8 |
| Magnesium hydro silicate | 0.5 | 25 | 1.9 | 1.6 |
| | 1 | 0 | 4.5 | 6 |
| | 5 | 0 | 5 | 9 |
| | 10 | 0 | 4.5 | 10 |
| | 15 | 0 | 1.2 | 8 |
| Water | 0.5 | 30 | 1 | 0.5 |
| | 1 | 5 | 4 | 5 |
| | 10 | 0 | 4 | 7 |
| | 20 | 0 | 5 | 10 |
| | 25 | 10 | 3 | 9 |

PD—Detached particles. The appearance was rated based on a 1 to 5 scale, where the highest value corresponds to the best appearance.

It was found that the co-polymers could be mixed with water (See Table 3) and that the fine volcanic rock powder obtained from crushed rocks contained inorganic binders (inorganic functional minerals) which, when being mixed with water and butyl acrylate and styrene co-polymers undergo a change that allows them to have more cohesion, adherence and flexibility. With this combination, base plates could be laminated with natural volcanic rock, but when they dried, fissures were created in the sheet with the result that the sheet had low resistance to friction and water. Therefore, a resin in a polyvinyl acetate emulsion, when added together with the vinyl-acrylic co-polymer, improves the stability of the mix, thus improving its adhesion, resistance to friction and water. Also, the resulting plates exhibited no cracks or fissures.

TABLE 3

Percentage of inorganic binders of the
different volcanic rock particles

| Particle Size | Percentage of Inorganic Binders |
|---|---|
| 3 mm | 2 |
| 2 mm | 2 |
| 1 mm | 2 |
| 10 microns | 10 |
| 5 microns | 20 |
| 3 microns | 30 |
| 1 micron | 40 |
| 3 mm + 2 mm | 4 |
| 3 mm + 1 mm | 5 |
| 3 mm + 10 microns | 15 |
| 3 mm + 5 microns | 24 |
| 3 mm + 3 microns | 36 |
| 3 mm + 1 micron | 32 |
| 1 mm + 10 microns | 15 |
| 3 mm + 1 mm + 3 microns | 98.5 |
| 2 mm + 1 mm + 2 microns | 95 |
| 1 mm + 5 microns + 1 micron | 97 |

As seen in Table 3, the best combination of volcanic rock particles was found to be the combination of 3 mm+1 mm+3 microns. Also, the 2 mm+1 mm+2 microns combination, as well as the 1 mm+5 microns+1 micron combination also showed excellent results, so these combinations are also considered in this invention. For any particular formulation, however, binding power and appearance are taken into account to determine the optimum mix. Generally, stronger binding is achieved by using smaller particle sizes, while appearance is judged based on the absence of cracks or fissures (from evaporation of gasses within the mix during setting) and the resultant similarity to unprocessed stone. Care must be taken as too many small particles produce fissures, while the larger grain sizes give the finished product its natural look.

With the preferred mixes disclosed herein, laminations were conducted on a solid base and after having made several tests, the following method was determined to be optimal: i) delimiting on the solid base the area on which the rock sheet is going to be laid, for which purpose, a perimeter edge is provided on the solid base; ii) adding in a uniform manner the mix described in 1, 2, 3 and 4 on the area delimited in the preceding stage until the area within the perimeter edge is covered; iii) letting the mix dry in the open for a 24 to 72 hours period; iv) roughing down the plate with diamond cups according to the type of finishing desired: rustic or smooth; v) cleaning the laminated plate of all the residues, preferably through vacuum cleaning; vi) applying a layer of water-resistant sealer over the sheet and vii) letting the water-resistant sealer dry for 3 hours in the open. The perimeter edge can be a rigid tape or strip which height depends on the thickness desired for the rock sheet.

The way to prepare the mix to make a rock sheet with the appearance of volcanic rock, includes the following steps:

i) mixing the different particles that form the portion of volcanic rock particles in a conventional way.

ii) moistening the portion of volcanic rock particles with 1 liter of water for each 4 kg of volcanic rock particles.

iii) adding all the vinyl-acrylic co-polymer, the polyvinyl acetate resin, the butyl acrylate and styrene co-polymers and the magnesium hydro silicate, and iv) homogenizing with a conventional stainless steel mixer, preferably at 650 rpm for 75 minutes.

Skilled artisans are aware that these preferred conditions may be varied as necessary depending upon the specific formulation and final article to be prepared. For example, the homogenizing speed and time can be varied depending upon the final components of the mix, and these components can be added in portions or all at once depending upon the size of the product that is being made, The agglutizing agent is preferably emulsified before being mixed with the other components. Also, the drying or curing time for the mix to set to a final hardened condition can vary depending upon the amount of water added in relation to the other component concentrations.

The obtained mix is something similar to cold volcanic lava which has the property of adhering and smelting on any material. After drying it has the same hardness and physical characteristics of natural volcanic rock, so we can apply the same finishing to it. It is important to mention that 90% of the formula comes from natural products.

Therefore, the invention also includes a plate that is useful for decorating construction surfaces as well as the surfaces of other objects, where such a plate includes the rock sheet made with the already described mix.

The plates obtained as a result of the process shown in this patent request are preferably the solution to use natural rocks in modern architectural projects which, due to their dimensions, weight and structure could never be covered with traditional plates made of natural volcanic rock because of their limiting factors of weight and laying at a certain height.

The intrinsic characteristics of this plate turn it into a product with many applications in the construction industry and for decoration. This plate has all the advantages of natural dimensional rocks (its color never changes, it has the appearance, scent and texture of natural rock) and no weight disadvantages because it is a much lighter product (up to 70% lighter) and it can be used as façade for buildings, shopping malls, schools, hospitals and houses. As a decorative element, it can be used in indoor and outdoor walls, as well as for a ceiling rose. It can be used for an unlimited amount of purposes. Imagination is its only limit. The mix used for laminating the plates allows us to apply the colloidal mix without having to use a mesh for adhering it, and when it dries the rock smelts with the material of the plate used, creating a unique cohesion. The roughing down with diamond cups makes it look like the ornamental dimensional rocks that are polished with diamond disks.

The variety of laminations that can be obtained on the plates is equal to the range of types and colors of the natural rocks found in the different deposits of volcanic rocks throughout the world.

The advantages of the plate discussed herein are further described below, and together with the attached figures such results that have not been achieved by any of the conventional products, can be proven. In particular, the weight of the plate is 70% less than one made from natural volcanic rock alone. Its appearance, texture, color and scent are the same as the plate made only of natural rock. The inventive plates have flexibility as well as the ability to provide thermal insulation, resistance to acids, resistance to high temperatures, resistance to water, the action of bacteria, fungi and other moist-related organisms, and resistance to UV rays (i.e., its color never changes). The plates are also useful for providing acoustic insulation and it provides an easy and fast installation on any type of heavy or light material.

These volcanic rock laminated plates can be used as facades for buildings, shopping malls, schools, hospitals and houses. As a decorative element, it can be used in indoor and outdoor walls, as well as for a ceiling rose. They can be used for an unlimited amount of purposes. Imagination is their only limit. One of their greatest advantages is their ease of installation, because they can be installed indoors and outdoors with the same simplicity and by using the same conventional frames and screws used to install plaster plates. For outdoor use they can be installed as easily as cement plates and the same commercial frames and screws used in cement plates can be used. In the case of soffits, they are installed as easily as common soffits, using the same conventional systems for their installation.

These plates have an additional advantage over solid stone plates: they can be affixed directly to walls with screws, adhesives or mortars without having to use frames. They can also be used to make furniture and decorating items such as tables and countertops.

It is important to highlight the fact that the formerly described mix can be applied to solid object surfaces such as containers, bottles, boxes or any other solid surfaces to decorate them. In order to do this, the surface must simply be cleaned, the mix is then applied by direct contact, then it must be allowed to dry and then it is roughed down. After it is cleaned from the resulting dust, the water resistant sealer is added and the decoration of the object is finished with its rock lamination.

As the final articles and products are preferably of rock construction, they are capable of use as weight bearing or structural elements in building construction. The mix can be reinforced as necessary for such applications. It is also possible to use the binding compositions disclosed herein with a filler of other solid particulate materials besides rock, and still be able to prepare articles and laminates. Suitable alternative filler materials include plastic, wood, glass, metals, or minerals. These filler materials can be of any selected size to provide the aesthetic or functional appearance or structure of the article or laminate.

The binding composition is formed of components that can be combined to hold together the filler into a solid, dense product that can be formed into the desired article as an alternative to the rock laminates described herein. The binding composition in particular utilizes the combination of volcanic rock particles having a relatively small particle size of 1 to 5 microns and a polymer mixture which work together in a combined amount to act as a binder for other components of the laminate. The amounts of these components are determined based on a dry binder composition, and the volcanic rock particles are present in an amount of 25 to 50% and the polymer mixture is present in an amount of 10 to 40%. Any of the polymer mixtures described herein for the mixes can be used in the binder composition. Another component of the binder composition is a silicate of the types described herein, and it is used in an amount of 1 to 10% to stabilize the binder composition. The components are mixed together with water in an amount to moisten and fluidize the composition. Next, the binder composition is combined with the filler material. Generally, about 40 to 60% by weight binder is combined with about 40 to 60% by weight of the filler to form a mix that can then be used to form a laminate or other article in the same manner as the rock mixes of the invention.

The resulting products can vary depending upon the desire of the user and they can be utilized in a number of different ways. The mix itself can be cast onto a floor of a structure and then allowed to dry before being polished and sealed to a final texture or finish. Tiles or panels can be made by applying the mix onto a suitable substrate, including any of wood, plastic, steel, aluminum, cement, ceramic or other supporting materials that enable the cast part to be moved or transported to a desired location. The back side of the support can include an adhesive for securing the tile to a floor or wall. When relatively thin panels are used these can be affixed to a structure with the use of screws or bolts. Apertures or holes can be provided in the panels for receiving bolts or other mounting hardware. It is also possible to affix the tiles or panels to steel structures which are used to construct a building with the panels or tile providing the decorative facing of the building.

The mix can also be shaped into an article by molding or casting into the desired configuration. In this way a variety of blocks, cubes, rods or other shapes can be prepared. The exposed surface of the article can be finished by polishing or not depending upon the desired final texture and finish. A conventional concrete or ceramic sealant can be applied after the desired finish is achieved.

When forming the mix into a product, various reinforcement materials can be used, including fiberglass, steel bars or lath, or a filler of wood, glass, ceramic or other stone can be included depending upon the desired appearance and strength requirements.

Specific construction products can easily be made, including walls, blocks or wall elements, fountains, pipes, window or door frames or other load bearing or decorative elements due to the versatility and ease of application of the mix. These products are resistant to moisture, acids or acid rain, seawater and other environments while retaining their beauty for years due to their durable nature.

What is claimed is:

1. A mix for manufacturing a rock laminate, which comprises:
volcanic rock particles having diameters between 1 micron and 5 mm present in an amount of greater than 50% by weight of the mix, wherein the rock particles are present in at least three fractions including a first fraction having a particle size of 1 to 5 microns and being present in an amount of 18 to 28% by weight of the mix; a second fraction having a particle size of 0.25 mm to 1.75 mm and being present in an amount of 10 to 20% by weight of the mix; and a third fraction having a particle size of 2 mm to 5 mm and being present in an amount of 30 to 40% by weight of the mix;
an agglutinating agent comprising a polymer mixture in an amount sufficient to act as a binder for the rock particles;
a silicate compound in an amount sufficient to stabilize the mix; and
water in an amount to moisten and fluidize the mix.

2. The mix of claim 1 wherein the rock particles are present in an amount of about 58% to 88% by weight of the mix.

3. The mix of claim 1 wherein the agglutinating agent is emulsified, is present in an amount of 8 to 25% by weight of the mix and comprises a water dispersible block copolymer and a vinyl polymer in a weight ratio of 1:4 to 3:2.

4. The mix of claim 3 wherein in the water dispersible polymer powder comprises the block copolymer in an amount of 4 to 10% by weight of the mix; and the vinyl polymer in an amount of 4 to 15% by weight of the mix.

5. A mix of for manufacturing a rock laminate, which comprises:
volcanic rock particles having diameters between 1 micron and 5 mm present in an amount of greater than 50% of the mix;
an agglutinating agent comprising a polymer mixture in an amount sufficient to act as a binder for the rock particles, with the mixture comprising a water dispersible block copolymer and a vinyl polymer in a weight ratio of 1:4 to 3:2, wherein the block copolymer is a butyl acrylate and styrene co-polymer, and the vinyl polymer comprises a vinyl acrylic co-polymer present in an amount of about 3 to 10% by weight of the mix; and a polyvinyl acetate resin present in an amount of about 1 to 5% by weight of the mix;
a silicate compound in an amount sufficient to stabilize the mix; and
water in an amount to moisten and fluidize the mix.

6. The mix of claim 1 wherein the silicate compound is a magnesium hydrosilicate in an amount of about 1 to 5% by weight of the mix.

7. The mix of claim 1 wherein the water is present in an amount of about 15 to 30% by weight of the mix.

8. An article prepared by forming the mix of claim 1 into a desired shape and allowing the formed mix to dry.

9. The article of claim 8 in the form of a sheet, plate, tile, column, or beam having an exterior surface that is polished to the desired finish.

10. The article of claim 8 which includes metal, glass, wood or fiber reinforcement or which is supported by a substrate of plastic, wood or metal, with the substrate optionally containing an adhesive for securing the article to a floor or building.

11. A mix for manufacturing a rock laminate, which comprises:
volcanic rock particles in a plurality of different size fractions having diameters between 1 micron and 5 mm and present in an amount of 58% to 88% by weight of the mix, wherein the rock particles are present in at least three fractions including a first fraction having a particle size of 1 to 5 microns and being present in an amount of 18 to 28% by weight of the mix; a second fraction having a particle size of 0.25 mm to 1.75 mm and being present in an amount of 10 to 20% by weight of the mix; and a third fraction having a particle size of 2 mm to 5 mm and being present in an amount of 30 to 40% by weight of the mix;

an agglutinating agent comprising a polymer mixture in an amount sufficient to act as a binder for the rock particles, wherein the agglutinating agent is emulsified, is present in an amount of 8 to 25% by weight of the mix and comprises a water dispersible block copolymer and a vinyl polymer in a weight ratio of 1:4 to 3:2;

a silicate compound of a magnesium hydrosilicate in an amount of about 1 to 5% by weight of the mix to stabilize the mix; and water in an amount of about 15 to 30% by weight of the mix to moisten and fluidize the mix.

12. The mix of claim 11 wherein in the water dispersible polymer powder comprises the block copolymer in an amount of 4 to 10% by weight of the mix; and the vinyl polymer in an amount of 4 to 15% by weight of the mix.

13. The mix of claim 12 wherein the block copolymer is a butyl acrylate and styrene co-polymer, and the vinyl polymer comprises a vinyl acrylic co-polymer present in an amount of about 3 to 10% by weight of the mix; and a polyvinyl acetate resin present in an amount of about 1 to 5% by weight of the mix.

14. An article prepared by forming the mix of claim 5 into a desired shape and allowing the formed mix to dry.

15. An article prepared by forming the mix of claim 11 into a desired shape and allowing the formed mix to dry.

* * * * *

UNITED STATES PATENT AND TRADEMARK OFFICE
CERTIFICATE OF CORRECTION

PATENT NO. : 8,475,928 B2
APPLICATION NO. : 13/018120
DATED : July 2, 2013
INVENTOR(S) : Jesùs Federico Arroyo-Bernal Page 1 of 1

It is certified that error appears in the above-identified patent and that said Letters Patent is hereby corrected as shown below:

In the Claims

Column 10:
Line 24 (claim 5), after "mix", delete "of".

Signed and Sealed this
Twentieth Day of August, 2013

Teresa Stanek Rea
*Acting Director of the United States Patent and Trademark Office*